July 24, 1928.

C. G. BLOOM 1,678,550

RIM LOCK

Filed Nov. 29, 1927

Inventor
C. G. Bloom
By Watson E. Coleman
Attorney

Patented July 24, 1928.

1,678,550

UNITED STATES PATENT OFFICE.

CARL G. BLOOM, OF DETROIT, MICHIGAN, ASSIGNOR OF ONE-HALF TO COSIMO M. MINARDO, OF DETROIT, MICHIGAN.

RIM LOCK.

Application filed November 29, 1927. Serial No. 236,513.

This invention relates to rim locks and more particularly to a device for locking demountable rims upon the wheels of automobiles to prevent unauthorized removal thereof.

An important object of the invention is to produce a device of this character, which may be relatively cheaply and at the same time durably and efficiently constructed.

A further object of the invention is to produce a device of this character which may be very easily secured to the tire rim, which will be neat in appearance and durable and efficient in service.

These and other objects I attain by the construction shown in the accompanying drawings, wherein for the purpose of illustration is shown a preferred embodiment of my invention and wherein:—

Figure 1:
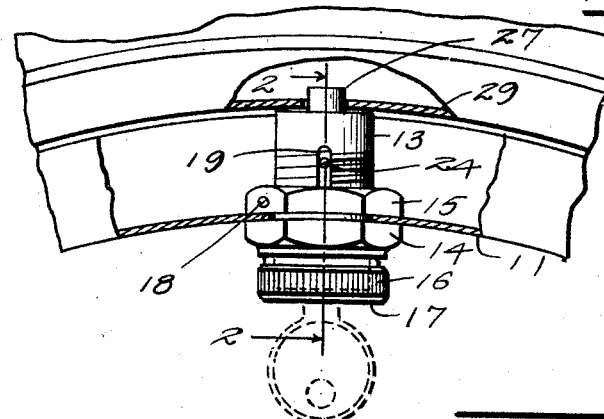
Figure 1 is a fragmentary side elevation of an automobile wheel felly and an applied tire, the rim embodying a lock constructed in accordance with my invention, the felly and rim being partially broken away.
Figure 2:
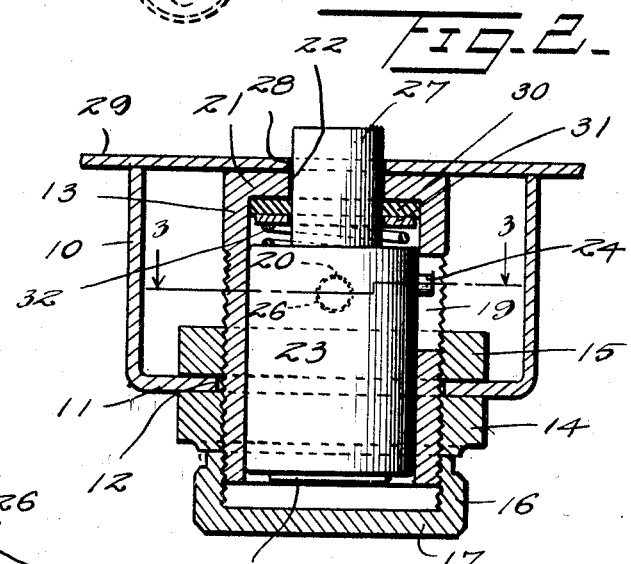
Figure 2 is a section on the line 2—2 of Figure 1.
Figure 3:
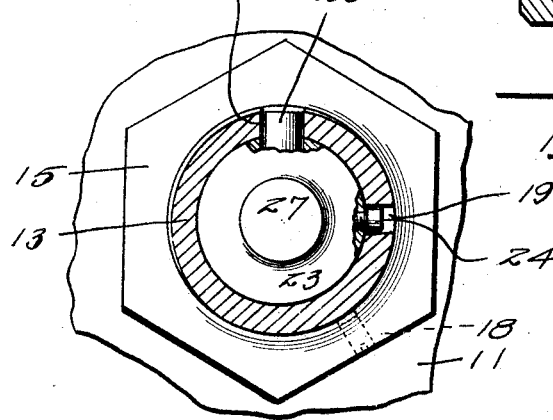
Figure 3 is a section on the line 3—3 of Figure 2.

Referring now more particularly to the drawings, the numeral 10 generally designates the usual channeled metal wheel felly, in the base 11 of which, in accordance with my invention, I form a single opening 12. Through this opening, I direct a sleeve 13, the exterior of which is threaded at its inner or base engaging end for the reception of nuts 14 and 15, which are adapted to be arranged at the opposite side of the base to clamp the sleeve in position with relation thereto, while the sleeve is directed radially of the completed wheel. The nut 14, which is arranged upon the inner face of the base, should have its innermost face slightly spaced from the inner end of the sleeve to permit application to the threads of the sleeve of the threaded flange 16 of a dust cap 17. The inner nut 15 is adapted for the passage of a set-screw 18 which, engaging against the threads of the sleeve, effectually prevents rotation of the nut with relation to the sleeve and accordingly prevents removal of the sleeve by rotation applied to the inner end thereof. In the side wall of the sleeve are formed a longitudinally extending slot 19 and an opening 20, the purpose of which will presently appear, while the outer end of the sleeve has an inwardly directed flange 21 defining a central opening 22.

Within the sleeve I arrange a lock barrel 23, the side wall of which has applied thereto a set-screw 24, which operates in the slot 19 and accordingly permits longitudinal movement of the barrel while preventing rotation thereof. The rotatable locking part, generally designated at 25, operates a radially extending bolt 26, which may be either withdrawn in the barrel or extended into the opening 20 in the side wall of the sleeve. This locking part 26 aligns with the opening of the sleeve only when the barrel is at its outermost or locking position. The barrel has an axial extension 27 at its outer end, which is adapted to extend through the opening 22 defined by the flange 21 of the sleeve and project into a socket 28 formed in the sleeve 29. Seating upon the flange in the sleeve is a packing element 30 upon which, through a steel washer 31, abuts one end of a spring 32, the opposite end of which engages the barrel and serves to normally force the barrel inwardly from the locking position.

It will, of course, be obvious that in applying a lock of this character, the lock will be arranged at a point remote from the valve stem opening of the rim, so that between the lock and the valve stem opening, removal of the demountable rim and its tire is prevented. It will furthermore be obvious that a lock of this character is very easy of application since it is merely necessary to form a single opening in the tire rim for the passage of the sleeve. The nut 15 may then be placed upon the sleeve and adjusted, so that the inner end of the sleeve is placed in the proper position, at which time the inner end of the sleeve is passed through the opening and the nut 14 applied thereto to secure the same in position. With the rim applied to the felly, the removal of the lock casing is impossible and since the rim may be only removed by an authorized person, loss of the lock or rim by theft is impossible.

Since the construction hereinbefore set forth is capable of a certain range of change and modification without materially departing from the spirit of the invention, I do not limit myself to such specific structure except as hereinafter claimed.

I claim:—

In combination with a wheel felly having a channel in its periphery, an opening formed in the base of the channel, a sleeve extended through said opening and having its exterior screw-threaded at its inner end, nuts upon the sleeve engaging the felly at the base of the channel and at the inner end of the felly to retain the sleeve in position, a lock barrel longitudinally shiftably mounted in the sleeve and held against rotation with relation thereto, a locking part associated with the barrel and adapted to engage in an opening in the sleeve in one position of the barrel and an axial projection upon the outer end of the barrel extending beyond the outer end of the sleeve when the barrel is in the last named position.

In testimony whereof I hereunto affix my signature.

CARL G. BLOOM.